United States Patent
Krisman

(10) Patent No.: US 11,385,976 B1
(45) Date of Patent: Jul. 12, 2022

(54) SYSTEMS AND METHODS FOR SPLIT-BRAIN DETECTION AND MITIGATION

(71) Applicant: Fortinet, Inc., Sunnyvale, CA (US)

(72) Inventor: Rusdy Krisman, Sydney (AU)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/199,802

(22) Filed: Mar. 12, 2021

(51) Int. Cl.
  *G06F 11/00* (2006.01)
  *G06F 11/20* (2006.01)
  *G06F 11/14* (2006.01)

(52) U.S. Cl.
  CPC ...... *G06F 11/2023* (2013.01); *G06F 11/1425* (2013.01); *G06F 11/2028* (2013.01); *G06F 11/2048* (2013.01); *G06F 2201/805* (2013.01)

(58) Field of Classification Search
  CPC ............. G06F 11/1425; G06F 11/2023; G06F 11/2028; G06F 11/2048
  See application file for complete search history.

(56) References Cited

U.S. PATENT DOCUMENTS

| | | | |
|---|---|---|---|
| 2014/0173330 A1* | 6/2014 | Samanta | G06F 11/1666 714/4.11 |
| 2019/0140890 A1* | 5/2019 | Mayya | H04L 41/12 |
| 2020/0192772 A1* | 6/2020 | Asveren | G06F 11/2023 |

OTHER PUBLICATIONS

FortiGate-7000 Handbook, Fortinet, Inc., Version 6.0.4, Dec. 6, 2019 (Year: 2019).*
FortiOS Cookbook, Fortinet, Inc., Version 6.0.0, Jun. 24, 2020 (Year: 2020).*

* cited by examiner

*Primary Examiner* — Michael Maskulinski
(74) *Attorney, Agent, or Firm* — HDC Intellectual Property Law, LLP

(57) ABSTRACT

Various approaches for multi-node network cluster systems and methods. In some cases systems and methods for incident detection and/or recovery in multi-node processors are discussed.

27 Claims, 6 Drawing Sheets

SYSTEMS AND METHODS FOR SPLIT-BRAIN DETECTION AND MITIGATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet. Inc.

FIELD

Embodiments of the present invention generally relate to multi-node network clusters, and more particularly to systems and methods for incident detection and/or recovery in multi-node processors.

BACKGROUND

A two-node active/passive (A/P) high availability (HA) network cluster is used to provide redundancy to a system by continuously or regularly performing session synchronizations for client-server traffic from a master (active) to a slave (passive) node over a single or a group of high availability synchronization (HA sync) interfaces on both the master and slave nodes. In such clusters, the designation of master and slave roles is relative to a particular user session, and user traffic processes through data transfer interfaces of the master node. While the redundancy of such network clusters in general increases network availability, in some cases the operational parameters of such network clusters can lead to catastrophic network failure.

Thus, there exists a need in the art for more advanced approaches, devices and systems for implementing and deploying network clusters.

SUMMARY

Various embodiments provide systems and methods for incident detection and/or recovery in multi-node processors.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
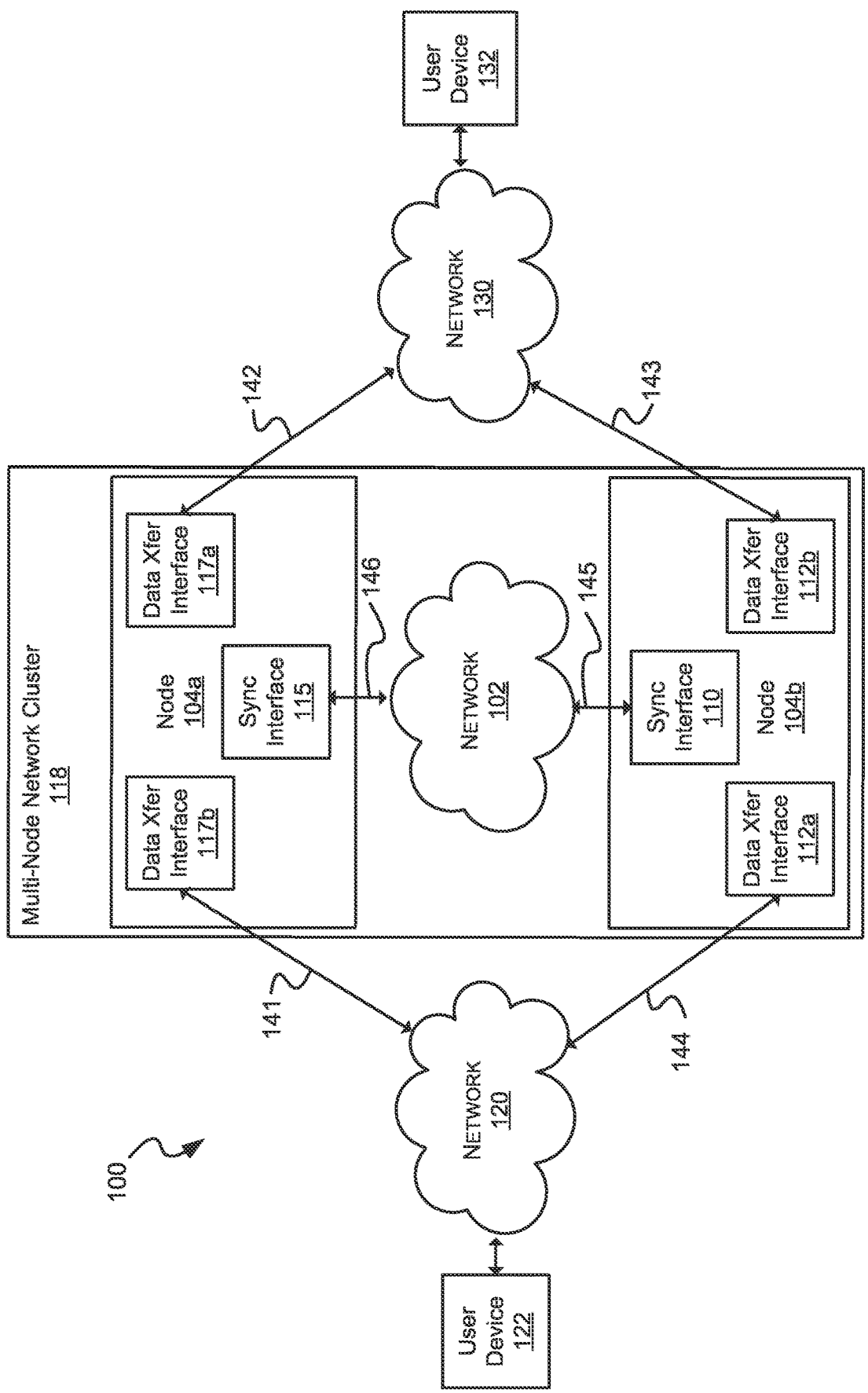
FIGS. 1A-C illustrate a network architecture including a network cluster capable of multi-node incident detection and recovery in accordance with some embodiments.

Various embodiments provide systems and methods for incident detection and/or recovery in multi-node processors.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an." and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The term "daemon" is used in its broadest sense to mean a set of instructions executable by a processing resource that runs as a background process to perform defined tasks. Based upon the disclosure provided herein, one of ordinary skill in the art will recognize a variety of daemons that may be used in relation to different embodiments.

The term "failover" is used in its broadest sense to mean user traffic that was to be processed by a first node that is processed by a second node based upon a transfer algorithm. Thus, as an example, user traffic may be grouped into a session that is to be processed by a master node. Upon failure of the master node, all or a remaining portion of the user traffic (i.e., the failover) is processed by a slave node. Based upon the disclosure provided herein, one of ordinary skill in the art will recognize a variety of failover that may be processed in accordance with different embodiments.

The term "split-brain" is used in its broadest sense to mean any situation where two or more nodes are operating as masters at the same time. Based upon the disclosure provided herein, one of ordinary skill in the art will recognize a variety of split-brain situations that may be identified and/or mitigated in accordance with different embodiments.

Various embodiments provide network clusters having split-brain processing capability. Such network clusters include a first node and a second node. The first node includes a first data transfer interface, a second data transfer interface, and a first sync interface. The second node includes a third data transfer interface, a fourth data transfer interface, and a second sync interface. The second node is communicably coupled to the first node via a sync path that includes at least the first sync interface and the second sync interface, and is communicably coupled to the first node via a data path that includes at least one pair of (a) the first data transfer interface and the third data transfer interface, and (b) the second data transfer interface and the fourth data transfer interface.

The second node includes a processing resource and a non-transitory computer-readable medium. The non-transitory computer-readable medium is coupled to the processing resource, and has stored thereon instructions that, when executed by the processing resource cause the processing resource to: determine a failure of the sync path; determine a potential for continued transfer of user traffic via the first data transfer interface and the second data transfer interface; and indicate a split-brain scenario upon detection of the failure of the sync path and the potential for continued transfer of user traffic via the first data transfer interface and the second data transfer interface.

In some instances of the aforementioned embodiments where the processing resource is a first processing resource, and the non-transitory computer-readable medium is a first non-transitory computer-readable medium, the first node further includes: a second processing resource and a second non-transitory computer-readable medium. The second non-transitory computer-readable medium is coupled to the second processing resource, and has stored thereon instructions that when executed by the second processing resource cause the second processing resource to: determine a failure of the sync path; determine a potential for continued transfer of user traffic via the third data transfer interface and the fourth data transfer interface; and indicate a split-brain scenario upon detection of the failure of the sync path and the potential for continued transfer of user traffic via the third data transfer interface and the fourth data transfer interface.

In various instances of the aforementioned embodiments, the non-transitory computer-readable medium has stored thereon instructions that when executed by the processing resource cause the processing resource to, based at least in part on the indicated split-brain scenario, perform a split-brain recovery. In some cases, the instructions to perform the split-brain recovery include instructions that when executed by the processing resource cause the processing resource to: indicate a network isolation of the second node based at least in part on an inability to communicate with the first node using one or both of the first data transfer interface and the second data transfer interface: switch the second node from a role as a slave node to a role as a master node: and accept failover user traffic. In some such cases, the non-transitory computer-readable medium has stored thereon instructions that when executed by the processing resource cause the processing resource to, based at least in part on the indicated network isolation of the second node, perform a fail back mitigation. In some cases, such instructions to perform fail back mitigation include instructions that when executed by the processing resource cause the processing resource to: enable a software daemon governing master communications: switch the second node from a role as a master node to a role as a slave node; and start synchronization with the first node.

In various cases, the instructions to perform the split-brain recovery include instructions that when executed by the processing resource cause the processing resource to: indicate a network isolation of the second node based at least in part on an inability to communicate with the first node using one or both of the first data transfer interface and the second data transfer interface; disable the third data transfer interface and the fourth data transfer interface; disable a software daemon governing master communications; clear all user traffic; and switch the second node from a role as a master node to a role as a slave node. In some such cases, the non-transitory computer-readable medium has stored thereon instructions that when executed by the processing resource cause the processing resource to, based at least in part on the indicated network isolation of the second node, perform a fail back mitigation. In some cases, the instructions to perform the fail back mitigation include instructions that when executed by the processing resource cause the processing resource to: enable a software daemon governing master communications; switch the second node from a role as a slave node to a role as a master node; and start synchronization with the first node.

In some cases, the instructions to perform the split-brain recovery include instructions that when executed by the processing resource cause the processing resource to perform master reset and restart of the network cluster including issuing commands to the first node using one or both of the third data transfer interface and the fourth data transfer interface.

Other embodiments provide methods for network cluster operation. Such methods include: determining, by a first node of a network cluster, a failure of a sync path communicably coupling the first node to a second node of the network cluster; determining, by the first node, a potential for continued transfer of user traffic via at least one of a first data transfer interface of the second node or a second data transfer interface of the second node; and indicating, by the first node, a split-brain scenario upon detection of the failure of the sync path and the potential for continued transfer of user traffic via the first data transfer interface or the second data transfer interface.

In some instances of the aforementioned embodiments, the methods further include performing, by the first node, a split-brain recovery. In some cases, such a split-brain recovery includes: indicating a network isolation of the first node based at least in part on an inability to communicate with the second node using one or both of the first data transfer interface or the second data transfer interface; switching the first node from a role as a slave node to a role as a master node; and accepting failover user traffic.

In some such cases, the methods further include, based at least in part on the indicated network isolation of the first node, performing a fail back mitigation by the first node. In some cases, performing the fail back mitigation includes: enabling, by the first node, a software daemon governing master communications; switching the first node from a role as a master node to a role as a slave node; and starting synchronization with the second node.

In some cases, performing the split-brain recovery includes: indicating a network isolation of the first node based at least in part on an inability to communicate with the second node using one or both of the first data transfer interface or the second data transfer interface; disabling a third data transfer interface and a fourth data transfer interface of the first; disabling a software daemon governing master communications; clearing all user traffic; and switching the first node from a role as a master node to a role as a slave node. In some such cases, the methods further include, based at least in part on the indicated network isolation of the first node, performing a fail back mitigation by the first node. In some cases, performing the fail back mitigation includes: enabling, by the first node, a software daemon governing master communications; switching the first node from a role as a slave node to a role as a master node; and starting synchronization with the second node.

In some cases, performing the split-brain recovery includes performing, by the first node, a master reset and restart of the network cluster including issuing commands to the second node using one or both of the third data transfer interface and the fourth data transfer interface.

Yet other embodiments provide non-transitory computer-readable storage media embodying a set of instructions, which when executed by one or more processing resources of a computer system, causes the one or more processing resources to perform a method. The method includes: determining, by a first node of a network cluster, a failure of a sync path communicably coupling the first node to a second node of the network cluster; determining a potential for continued transfer of user traffic via at least one of a first data transfer interface of the second node or a second data transfer interface of the second node; indicating a split-brain scenario upon detection of the failure of the sync path and the potential for continued transfer of user traffic via the first data transfer interface or the second data transfer interface; and based at least in part on indicating the split-brain scenario, performing, by the first node, a split-brain recovery.

Example embodiments will now be described more fully hereinafter with reference to the accompanying drawings, in which exemplary embodiments are shown. This disclosure may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Turning to FIG. 1A, network architecture 100 including a multi-node network cluster 118 capable incident detection and recovery in accordance with some embodiments. As shown, network architecture 100 includes a network 120 communicably coupling a user device 122 with network cluster 118 and a network 130 communicably coupling a user device 132 to network cluster 118. Network cluster 118 includes a node 104a and a node 104b that are communicably coupled via a network 102.

Network 102, network 120, and network 130 may be any type of networks or combination of networks. For example, any or all of networks 102, 120, 130 may include a combination of a home network accessed by a user device; a corporate network that connects nodes 104; and/or the Internet connecting the home network to the corporate network. As another example, any or all of networks 102, 120, 130 may be a single corporate network. Further, those skilled in the art will appreciate that any or all of networks 102, 120, 130 can be: a wireless network, a wired network or a combination thereof that can be implemented as one of the various types of networks, such as an Intranet, a Local Area Network (LAN), a Wide Area Network (WAN), an Internet. and/or the like. Further, any or all of networks 102, 120, 130 can either be a dedicated network or a shared network. The shared network represents an association of the different types of networks that use a variety of protocols, for example, Hypertext Transfer Protocol (HTTP), Transmission Control Protocol/Internet Protocol (TCP/IP). Wireless Application Protocol (WAP), and the like. Based upon the disclosure provided herein, one of ordinary skill in the art will recognize a variety of network types, network combinations, and/or connections that may be included as part of any or all of networks 102, 120, 130.

User device 122 and user device 132 may be any device known in the art that is capable of communicably coupling to one or more of networks 102, 120, 130 and sending and receiving data via the network. Such user devices may include, but are not limited to, desktop computers; mobile phones, laptop computers, or tablet computers. Based upon the disclosure provided herein, one of ordinary skill in the art will recognize a variety of endpoint devices that may be used in relation to different embodiments.

Node 104a includes a sync interface 115 that is coupled to network 102 via a sync path 146, and node 104b includes a sync interface 110 is coupled to network 102 via a sync path 145. Nodes 104a, 104b communicate synchronizing information and commands via sync path 145, sync path 146, and network 102. Any subset of sync interface 115, sync path 146, network 102, sync path 145, and sync interface 110 may be referred to herein as the sync path.

Node 104a includes a data transfer interface 117a and a data transfer interface 117b through which user traffic is processed. Similarly, node 104b includes a data transfer interface 112a and a data transfer interface 112b through which user traffic is processed. Thus, when node 104a is acting as a master, user traffic between user device 122 and user device 132 transfers via network 120, data path 141, data transfer interface 117b, data transfer interface 117a, data path 142, and network 130. Any subset of data transfer interface 117a and data transfer interface 117a is referred to herein as a node 104a user traffic path. Similarly, when node 104b is acting as a master, user traffic between user device 122 and user device 132 transfers via network 120, data path 144, data transfer interface 112a, data transfer interface 112b, data path 143, and network 130. Any subset of data transfer interface 112a and data transfer interface 112b is referred to herein as a node 104b user traffic path.

In operation, one of node 104a or node 104b operates as the master node handling user traffic for network cluster 118. The other node operates as a slave mode. When the master node fails, the other node is switched to be the master node and takes over processing the user traffic. This transition from slave node to master node has previously occurred whenever the sync path failed to operate properly. Such an approach has been found to result in split-brain scenarios where more than one node on network cluster 118 concurrently advertise itself as a master. There is a possibility that such a situation creates a broken network cluster on which user traffic exiting one node 104 could return via another node 104 without the session synchronization information passing over the sync path being present. Without the presence of such synchronization information, the user traffic will be rejected by the other node 104. Such a split-brain situation potentially renders network cluster 118 useless in the event more than one of nodes 104 advertises itself as the master to the same network layer addresses of the network. The risk exposure is greater where the network cluster 118 is a two-node network cluster (as shown in this embodiment). In such a situation, all nodes 104 of the network cluster 118 are advertising itself as the master and there are no other nodes that could be used in a quorum process to decide which node should assume the master role. Such a quorum process is only possible for a network node that has three or more nodes.

As one particular scenario using a two-node network cluster as an example, node 104*a* is operating as the master carrying user traffic over the node 104*a* user traffic path and node 104*b* is operating as the slave. Again, when user traffic is being processed properly, and the master node (in this case node 104*a*) and slave node (in this case node 104*b*) are engaged in synchronizing communications over the synchronization path. In such a scenario the sync path may fail (e.g., one or more of sync interface 110, sync interface 115, and/or network 102 may fail) while the node 104*a* user traffic path remains functional. Such a failure of the sync path causes the slave node (in this case node 104*b*) to assume that the master node (in this case node 104*a*) has failed, and to remedy this situation, the slave node begins to operate as a master node and thereby seamlessly take on the user traffic previously being directed to the other node. However, while the sync path has failed, the node 104*a* user traffic path is still operational and continuing to handle user traffic. This results in a split-brain scenario where both node 104*a* and node 104*b* simultaneously think the other node has become unavailable and therefore each must carry on or take over the master role. This could potentially create a bigger problem with both nodes forwarding user traffic at the same time and thereby breaking session statefulness. It could also bring network cluster 118 down in its entirety.

Another scenario that a split-brain scenario can introduce is where one or both of nodes 104*a*, 104*b* are still accepting ingress user traffic without a way to send egress traffic out (i.e., one of data transfer interfaces 117 is operational, but the other has failed). Such a scenario creates what is referred to herein as traffic black holing where one of nodes 104 accepts ingress user traffic, but cannot transfer the user traffic out leaving the user traffic trapped and preventing a proper failover to the other node 104 remote node.

Yet another scenario is referred to herein as a fail back scenario. A fail back scenario occurs when the user traffic path and the synchronization path for one of nodes 104*a*, 104*b* becomes available again after the onset of a split-brain scenario. In such a scenario, user traffic is redirected back to the node that recently became newly available. However, the newly available node will fail to seamlessly carry over user traffic that it starts to take back from the other node 104 that had stepped in to behave as the master because of a failure to properly synchronize the transfer using the synchronization path. Using an example where node 104*a* failed and node 104*b* began to operate as a master in place of node 104*a*. The user traffic is transferred to node 104*b* as would be expected for network cluster 118. Then node 104*a* becomes available again and before synchronization is possible with node 104*b*, starts operating as the master and taking the user traffic.

A cluster session synchronization conflict may occur because node 104*a* has stale user session information from its previous state before experiencing the split-brain situation. Node 104*a* might also reject the cluster session synchronization from node 104*b* because node 104*a* still considers itself to be the master. This occurs where the master node only happens in the direction from the master to the slave.

Some embodiments discussed herein provide for automated detection of a potential split-bran situation. In some cases, such embodiments further provide for recovering from the split-brain situation. In various cases, the aforementioned embodiments provide for detection of and recovery from related maladies of network isolation, user traffic black holing, failover of user traffic, and fail back of user traffic in a way that minimizes service disruptions.

Figure 1B:
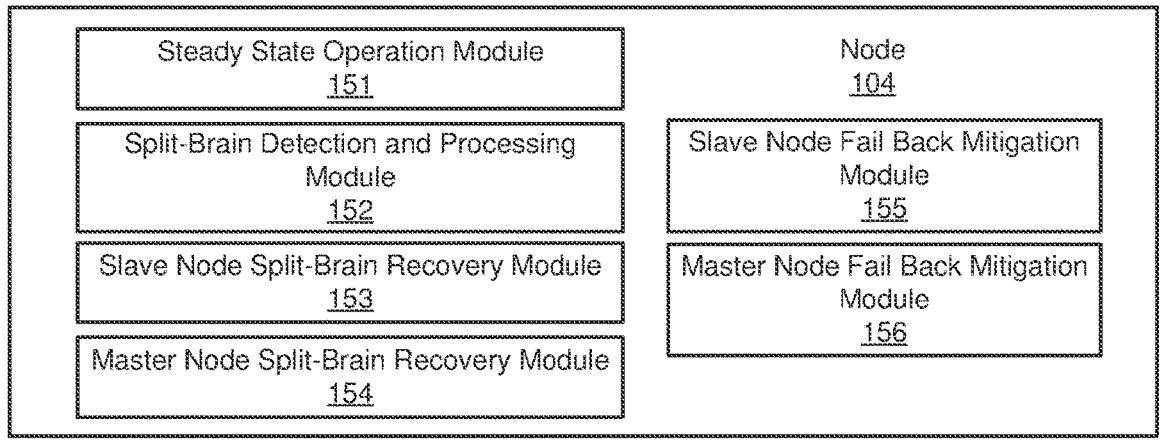

Turning to FIG. 1B, functional modules of nodes 104 are shown in accordance with some embodiments. The functional modules are included in all nodes 104 as such nodes will operate in both a master node role and a slave node role depending upon the operational state of network cluster 118. For the purposes of discussion of FIG. 1B, node 104*a* is initially the master node of network cluster 118 and node 104*b* is initially the slave node of network cluster 118. As one of ordinary skill in the art will appreciate, the master node and the slave node could change status (a slave node becomes a master node, and a master node becomes a slave node) as the network cluster continues operation, and the initial designation of node 104*a* as a master node and node 104*b* as a slave node is arbitrary for the purposes of explaining FIG. 1B.

A steady state operation module 151 is configured to govern standard operation of node 104*a* and node 104*b* for both slave node operation and master node operation. This governance of steady state operation includes operational control for slave node operation, and operational control for master node operation. Slave node operation includes monitoring of the sync path including sync interface 115 and sync interfaces 110. Master node operation includes the master node (at this juncture node 104*a*) advertising itself as the master for network cluster 118, processing of user traffic via the data paths including data transfer interfaces (i.e., data transfer interfaces 117 of node 104*a* or data transfer interfaces 112 of node 104*b*), transferring user traffic to intended recipients via networks 120, 130, and user traffic session synchronization and control though communication with the other nodes 104 that is/are operating as a slave node(s)(at this juncture node 104*b*).

A split-brain detection and processing module 152 is configured to monitor the operational status of the sync path including sync interface 115 and sync interfaces 110 to assure communications are being received by one node 104 from another node 104, and to monitor the capability of communicating from one node 104 to another node 104 in network cluster 118 via data transfer paths including between data transfer interface 117*b* and data transfer interface 112*a*, and between data transfer interface 117*a* and data transfer interface 112*b*. In operation, split-brain detection and processing module 152 monitors the sync path to assure expected communication is being transferred to/from the other nodes 104 within network cluster 118. Split-brain detection and processing module 152 maintains a split-brain scenario flag that is set to indicate that no split-brain scenario is ongoing until a split-brain scenario has been detected. This can be done, for example, by setting a Boolean switch SPLIT_BRAIN_DETECTED=FALSE in a memory of the node 104 by split-brain detection module 152.

Where split-brain detection and processing module 152 detects a failure of the sync path or is informed of a failure of the sync path by another node 104, it sets the split-brain flag to indicate that a split-brain scenario is ongoing. This can be done, for example, by setting the Boolean switch SPLIT_BRAIN_DETECTED=TRUE in the memory of the node 104 by split-brain detection module 152. Having detected a failure of the sync path, split-brain detection and processing module 152 attempts to communicate via data transfer paths with another node 104 that is operating as the master node of network cluster 118. For example, where node 104*b* is the slave node, split-brain detection and processing module 152 of node 104*b* attempts to communicate with node 104*a* via data transfer interface 112*a*, network 120, and data transfer interface 117*b*, and/or via data transfer interface 112*b*, network 130, and data transfer interface 117*a*.

Where communications between the nodes 104 is still possible over the data transfer paths, the slave node 104 signals the master node via the data transfer path of the failure of the sync path, and the master node uses the data transfer path to perform whatever synchronization needs to be done and to negotiate master and slave control between the nodes while processes are performed to re-establish the failed sync path. As communication is possible between the nodes 104 via the data transfer path, the slave node 104 will not begin to advertise itself as the master node as the slave node 104 can safely assume that user traffic is still being carried by the data transfer interfaces of the master node.

Using the data transfer interfaces, split-brain detection and processing module 152 of slave node 104*b* indicates to master node 104*a* that the sync interface is not accessible. In response, master node 104*a* restarts synchronization for the ongoing user traffic by signaling slave node 104*b* over the data transfer interfaces. In this way, operation of the network cluster is maintained synchronized using the data transfer interfaces between the master node 104*a* and slave node 104*b*. Such an approach of using the data transfer interfaces to re-establish synchronization of network cluster 118 facilitates a successive failure situation where the data transfer interfaces on master node 104*a* fail sometime after failure of the sync path. Where the sync path becomes operational again, network cluster 118 is restored to a normal operating condition (steady state), and the processing is controlled by steady state operation module 151. Using the aforementioned approach of monitoring data transfer paths instead of simply transitioning slave node 104*a* to master node operation based upon failure of the sync path, both node 104*a* and node 104*b* do not simultaneously advertise as the master node for network cluster 118 and thus a split-brain scenario is mitigated.

Alternatively, where split-brain detection and processing module 152 determines that communications between nodes 104 is not possible over the data transfer paths, split-brain detection and processing module 152 determines whether the node is operating as a slave node or a master node. For split-brain detection and processing module 152 of node 104*a* that is operating as the master node, continued processing is governed by a master node split-brain recovery module 154, and for split-brain detection and processing module 152 of node 104*b* that is operating as the slave node, continued processing is governed by a slave node split-brain recovery module 153.

In operation, slave node split-brain recovery module 153 attempts communication with master node 104*a* using the data transfer paths (i.e., via data transfer interface 112*a*, network 120, and data transfer interface 117*b*, and/or via data transfer interface 112*b*, network 130, and data transfer interface 117*a*). Where communication via the data transfer interfaces is now possible slave node split-brain recovery module 153 terminates and processing control is returned to split-brain detection and processing module 152.

Alternatively, where communication via the data transfer paths is still not possible slave node split-brain recovery module 153 flags a network isolation scenario for slave node 104*b*. This can be done, for example, by setting a Boolean switch NETWORK_ISOLATION=TRUE in the memory of slave node 104*b*. In addition, slave node 104*b* switches its role to master node for network cluster 18 and begins to advertise itself as the master node having determined that it can no longer communicate with master node 104*a* via the data transfer paths. Where node 104*b* (the former slave node) cannot communicate with master node 104*a* via the data transfer paths, node 104*b* can safely assume the role of the master node and accept the failover user traffic. Acceptance of the failover traffic can be done by whatever mechanism is available (such as, for example, gratuitous address resolution protocol (GARP) and/or first hop redundancy protocol (FHRP)) and/or Layer 3 of associated networks (such as, for example, dynamic routing) protocol still running on external systems. As discussed below in relation to master node split-brain recovery module 153, master node 104*a* is concurrently switching to the role as a slave node and ceasing any advertisement as the master node for network cluster 118. As such, more than one node 104 of network cluster 118 are not simultaneously advertising itself as the master node. With the former slave node 104*b* now operating as the master node for network cluster 118 and accepting failover user traffic, control is returned to split-brain detection and processing module 152.

In operation, master node split-brain recovery module 154 attempts communication with slave node 104*b* using the data transfer paths (i.e., via data transfer interface 112*a*, network 120, and data transfer interface 117*b*, and/or via data transfer interface 112*b*, network 130, and data transfer interface 117*a*). Where communication via the data transfer interfaces is now possible master node split-brain recovery module 154 causes a master reset and network cluster restart using communications performed over the data transfer paths. With this reset and restart complete, master node split-brain recovery module 154 terminates and processing control is returned to split-brain detection and processing module 152.

Alternatively, where communication via the data transfer paths is still not possible master node split-brain recovery module 154 flags a network isolation scenario for master node 104*a*. This can be done, for example, by setting a Boolean switch NETWORK_ISOLATION=TRUE in the memory of node 104*a*. In addition, master node 104*a* turns of all master interfaces (e.g., data transfer interfaces 117 and sync interface 115, turns off all software daemons (e.g., Layer 2 processes for the associated networks) governing master communications with slave node 104*b* via sync interface 115 and/or data transfer interfaces 117, and clears all ongoing sessions of user traffic. Turning off all of the interfaces of master node 104*a* prevents user traffic blackholing in master node 104*a* and triggers an automated failover to external systems via Layer 2 of associated networks (such as, for example. GARP/FHRP) and/or Layer 3 of associated networks (such as, for example, dynamic routing) protocol still running on external systems. Turning off the software daemons prepares for a graceful, future fail back. Clearing all ongoing sessions of user traffic eliminates stale information and prepares master node 104*a* to receive future session synchronization in accordance with the operation of network cluster 118 without causing conflicts due to stale local session information.

In addition, master node 104*a* switches its role to a slave node for network cluster 118 and ceases to advertise itself as the master node. As discussed above in relation to slave node split-brain recover module 153, slave node 104*b* is concurrently switching to the role of master node and advertising itself as the master node for network cluster 118. As such, at least one node 104 is taking over user traffic processing for network cluster 118. With the former master node 104*a* now operating in a slave node role for network cluster 118, processing control is returned to split-brain detection and processing module 152.

With operational control returned to split-brain detection and processing module 152, split-brain detection and processing module 152 attempts communications via the sync interface of the respective node 104 (i.e., one of sync interface 115 or sync interface 110) to determine whether the sync path is again operational. Once split-brain detection and processing module 152 determines that communication via the sync path has been restored, network cluster 118 is restarted via the sync path (including sync interface 110 and sync interface 115). Such a network cluster restart can be done using any process known in the art for restoring network cluster operability.

With the network cluster restarted, split-brain detection and processing module 152 whether network isolation was flagged as part of the processing by slave node split-brain recovery module 153 or master node split-brain recovery module 154. Where network isolation was not flagged (e.g., NETWORK_ISOLATION=FALSE), split-brain detection and processing module 152 resets the previously set split-brain flag. This can be done, for example, by setting the Boolean switch SPLIT_BRAIN_DETECTED=FALSE in the memory of the respective nodes 104. Network cluster 118 has now fully restored to a normal operating condition (steady state) with minimum service disruptions, and processing control returns to steady state operation module 151.

Alternatively, where split-brain detection and processing module 152 determines that network isolation was flagged as part of the processing by slave node split-brain recovery module 153 or master node split-brain recovery module 154 (e.g., NETWORK_ISOLATION=TRUE), all interfaces are turned on for both the current master node 104*b* and the current slave node 104*a*. Processing by network cluster 118 remains with the current master node 104*b* until the nodes detect that all interfaces have been restored to operation. The restoration can be verified by attempted communications between current master node 104*b* and current slave node 104*a* using the data transfer paths.

For split-brain detection and processing module 152 of current master node 104*b*, processing control is passed to a master node fail back mitigation module 156. For split-brain detection and processing module 152 of current slave node 104*a*, processing control is passed to a slave node fail back mitigation module 155.

In operation, slave node fail back mitigation module 155 attempts to communicate with current master node 104*b* using the data transfer paths. Where communication via the data transfer paths is now possible, no changes are required to return from network isolation, and processing control is returned to split-brain detection and processing module 152.

Alternatively, where communication via the data transfer paths is still not possible, current slave node 104*a* turns on all software daemons governing master communications with a slave node via the sync path and/or the data transfer paths, and reestablishes all external protocols in preparation for taking on the responsibilities of a master node in network cluster 118. With this done, current slave node 104*a* switches to the role of master node for network cluster 118 and issues the commands required to resynchronize operation of network cluster 118 using the sync path. The master node does not need to know if slave node experiences network isolation, but rather only needs to restart network cluster synchronization as soon as the sync path becomes available. As discussed below in relation to master node fail back mitigation module 156, current master node 104*b* is concurrently switching to the role of a slave node in network cluster 118. As such, only one node 104 is operating as the master node within network cluster 118 at any given time. With the current slave node 104*b* now operating in the role of master node for network cluster 118, processing control is returned split-brain detection and processing module 152.

In operation, master node fail back mitigation module 156 attempts to communicate with current slave node 104*a* using the data transfer paths. Where communication via the data transfer paths is now possible, no changes are required to return from network isolation, and processing control is returned to split-brain detection and processing module 152.

Alternatively, where communication via the data transfer paths is still not possible, current master node 104*b* turns on all software daemons governing master communications with a slave node via the sync path and/or the data transfer paths, and reestablishes all external protocols in preparation for taking on the responsibilities of a slave node in network cluster 118. Re-enabling the slave node's Layer 2 and/or Layer 3 processes (daemons) triggers user traffic session fail back from external systems via Layer 2 of the associated networks (such as, for example, GARP/FHRP) and/or Layer 3 of the associated networks (such as dynamic routing) protocol convergence. Reestablishing external Layer 2 and/or Layer 3 networking connectivity with external systems via Layer 2 (such as, for example, GARP/FHRP) and/or Layer 3 (such as dynamic routing) protocol also triggers user traffic session fail back. Any fail back user traffic is received by slave node 104*a* which negotiates with master node 104*b* via the sync path to assume the role of master node.

With the various re-enabling processes complete, current master node 104*b* switches to the role of slave node for network cluster 118 and starts resynchronization of the network cluster under the command of master node 104*a*. Slave node 104*b* maintains its data transfer interfaces (i.e., data transfer interface 112*a* and data transfer interface 112*b*) in a disabled state until the latest user traffic session information is received from master node 104*a* via sync interface 110. From this point, slave node 104*b* receives regular network cluster session synchronization from master node 104*a*. Once the network cluster synchronization is complete, slave node 104*b* re-enables its data transfer interfaces (i.e., data transfer interface 112*a* and data transfer interface 112*b*) and initiates monitoring of all data transfer paths to verify reliability and readiness to carry over user traffic if or when a need arises. As discussed above in relation to slave node fail back mitigation module 155, current slave node 104*a* is concurrently switching to the role of master node. As such, a node 104 is operating as the master node within network cluster 118. With the node 104*b* now operating in the role of a slave node for network cluster 118, network cluster 18 has been restored to a normal operating condition (steady state) with minimum service disruptions and processing control is returned to split-brain detection and processing module 152.

With processing control returned to split-brain detection and processing module 152, split-brain detection and processing module 152 resets both its network isolation flag and its split-brain flag. This can be done, for example, by setting the Boolean switch NETWORK_ISOLATION=FALSE and SPLIT_BRAIN_DETECTED=FALSE in the memory of the respective nodes. Network cluster 118 has now fully restored to a normal operating condition (steady state) with minimum service disruptions, and processing control returns to steady state operation module 151

Figure 1C:
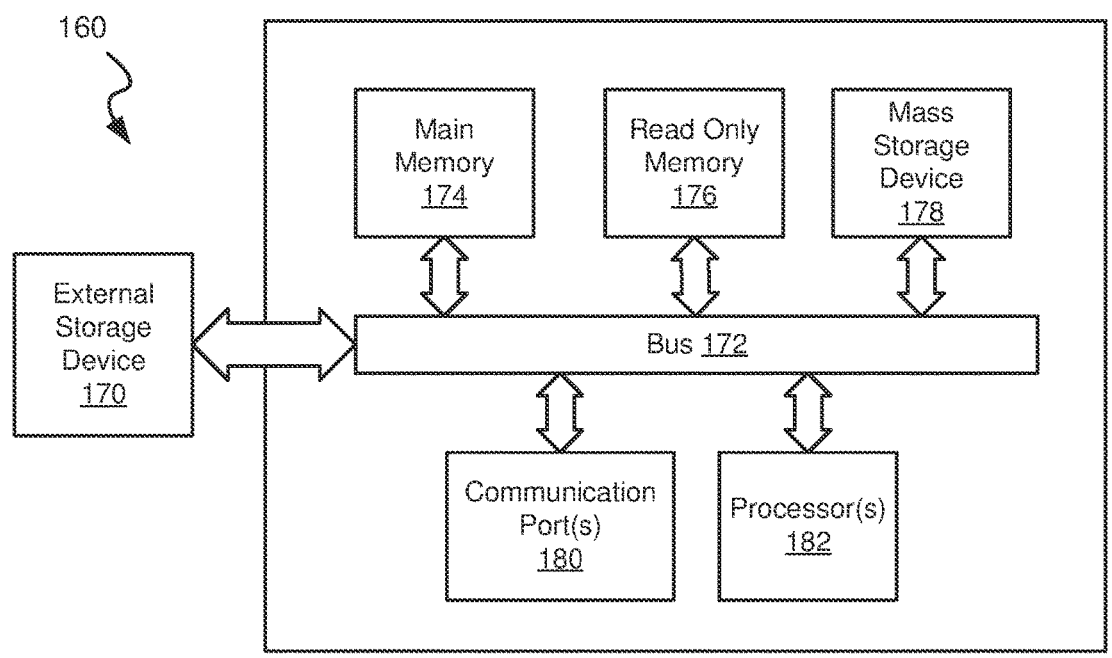

Turning to FIG. 1C, an example computer system 160 in which or with which embodiments of the present invention may be utilized is shown. In some case, one or more of node 104a or node 104b may be implemented to include the features of example computer system 160. As shown in FIG. 1C, computer system 160 includes an external storage device 170, a bus 172, a main memory 174, a read-only memory 176, a mass storage device 178, a communication port 180, and one or more processors 182.

Those skilled in the art will appreciate that computer system 160 may include more than one processor 182 and communication ports 180. Examples of processor 1820 include, but are not limited to, an Intel® Itanium® or Itanium 2 processor(s), or AMD® Opteron® or Athlon MP® processor(s). Motorola® lines of processors, FortiSOC™ system on chip processors or other future processors. Processor 182 may include various modules associated with embodiments of the present invention.

Communication port 180 can be any of an RS-232 port for use with a modem-based dialup connection, a 10/100 Ethernet port, a Gigabit or 10 Gigabit port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read-Only Memory 176 can be any static storage device(s) e.g., but not limited to, a Programmable Read-Only Memory (PROM) chips for storing static information e.g. start-up or BIOS instructions for processor 182.

Mass storage 178 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie. Nexsan Technologies, Inc. and Enhance Technology, Inc.

Bus 172 communicatively couples processor(s) 182 with the other memory, storage, and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 182 to a software system.

Optionally, operator and administrative interfaces. e.g. a display, keyboard, and a cursor control device, may also be coupled to bus 172 to support direct operator interaction with the computer system. Other operator and administrative interfaces can be provided through network connections connected through communication port 180. An external storage device 170 can be any kind of external hard-drives, floppy drives. IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned example computer system limit the scope of the present disclosure.

Figure 2:
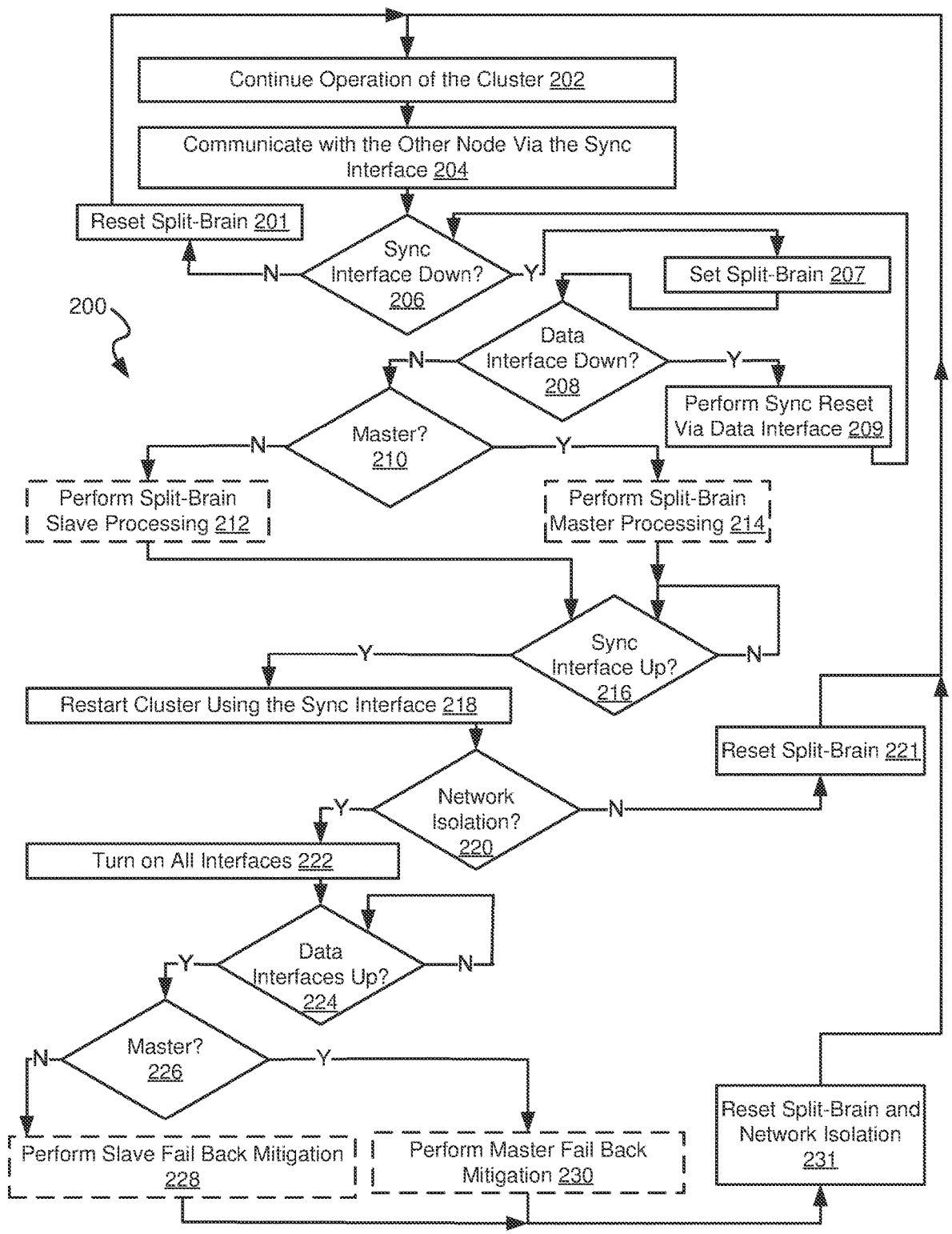
FIG. 2 is a flow diagram showing a method in accordance with various embodiments for detecting an incident in a network cluster, and for mitigating the detected incident.

Turning to FIG. 2, a flow diagram 200 shows a method in accordance with various embodiments for detecting an incident in a network cluster, and for mitigating the detected incident. Following flow diagram 200, a network cluster operates where one node is the master and the other node is the slave (block 202). The master advertises itself as the master for the cluster and handles user traffic (i.e., a network session) by receiving data at one data transfer interface and providing it to a downstream recipient via another data transfer interface. While the master is processing the user traffic, both the master node and a sync node of the network cluster communicate with each other via a sync interface (block 204). The communication may be initiated by either or both of the master or the slave depending upon the particular implementation. Such communications are used to assure harmonious operation of the network cluster.

Where a node detects that communications are possible via the sync interface (block 206), a split-brain scenario flag is reset (block 201). This can be done, for example, by setting a Boolean switch SPLIT_BRAIN_DETECTED=FALSE in a memory of the nodes that detect the operational sync interface. Alternatively, where either the master node or the slave node fails to receive communications via the sync interface as expected (block 206), a split-brain scenario flag is set on each node that detected the sync interface failure (block 207). This can be done, for example, by setting the Boolean switch SPLIT_BRAIN_DETECTED=TRUE in the memory of each of the nodes that detected the circumstance. In addition, either or both of the master node or the slave node that detected the failure of the sync interface attempts to communicate with the other node via one of the data transfer interfaces supported by each of the nodes to determine whether the data transfer interfaces between the nodes are capable of supporting communications between the nodes (block 208).

Where communications between the nodes is still possible over the data transfer interfaces (block 208), the communication is used to perform whatever synchronization needs to be done over the data transfer interfaces and to negotiate master and slave control between the nodes while processes are performed to re-establish the failed sync interfaces (block 209). As communication is possible between the nodes via the data transfer interfaces, the slave node will not begin to advertise itself as the master node as the slave node can safely assume that user traffic is still being carried by the data transfer interfaces of the master node.

Using the data transfer interfaces, the slave node indicates to the master node that the sync interface is not accessible to the slave node. In response, the master node restarts synchronization for the ongoing user traffic by signaling the slave node over the data transfer interfaces. In this way, operation of the network cluster is maintained in sync using the data transfer interfaces. Such an approach of using the data transfer interfaces to re-establish network cluster synchronization facilitates a successive failure situation where the data transfer interfaces on the master node fail sometime after failure of the sync interface as the process is returned to block 206. Where the sync interface becomes operational, the network cluster is restored to a normal operating condition (steady state), and the process returns again to block 202. Of note, the data transfer interfaces are re-checked for availability (block 208). Using the aforementioned approach (blocks 206-209), both nodes do not simultaneously advertise as the master node for the network cluster and thus a split-brain scenario is mitigated.

Alternatively, where communications between the nodes is not possible over the data transfer interfaces (block 208), each node determines whether they are the master or the slave (block 210). The slave node performs split-brain slave processing (block 212) and the master node performs split-brain master processing (block 214). The various processes of block 212 are shown in a flow diagram of the same number in FIG. 3, and the various processes of block 214 are shown in a flow diagram of the same number in FIG. 4.

Figure 3:
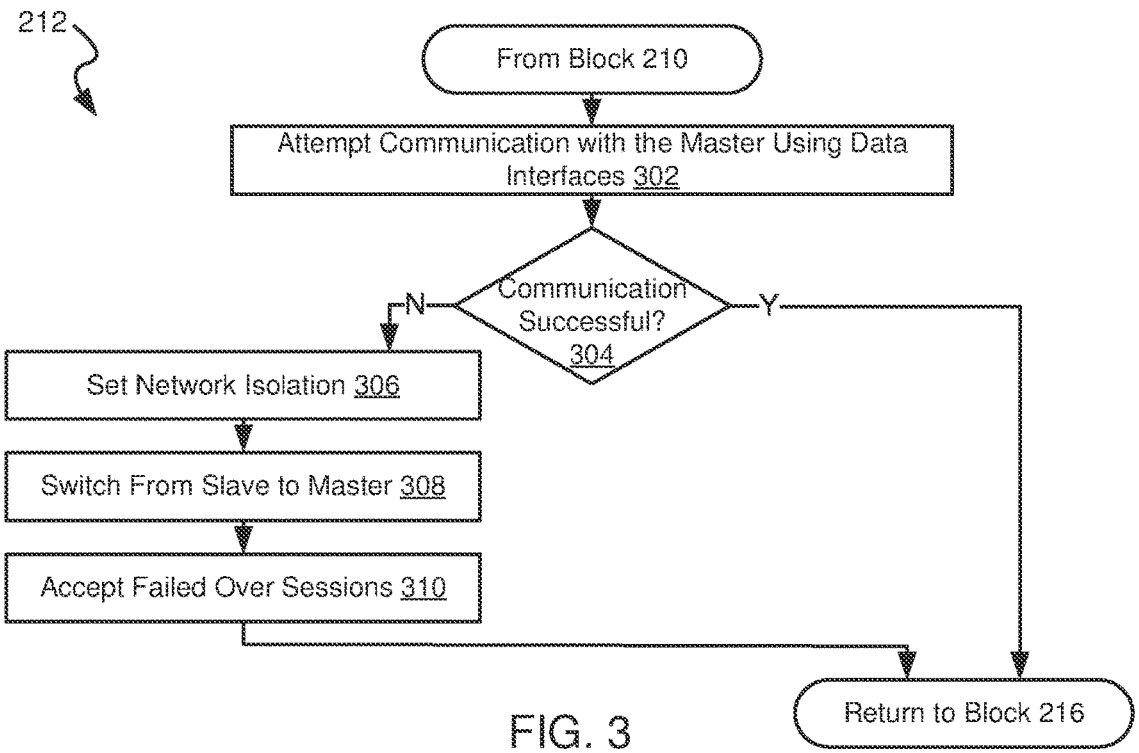
FIG. 3 is a flow diagram showing a method in accordance with some embodiments for performing split-brain recovery in a slave node of a network cluster.

Turning to FIG. 3 and following flow diagram 212, the slave node attempts communication with the master node using the data transfer interfaces (block 302). Where communication via the data transfer interfaces is now possible (block 304), split-brain slave processing completes and control is returned to block 216 of FIG. 2. Alternatively, where communication via the data transfer interfaces is still not possible (block 304), the slave node flags a network isolation scenario for the slave node (block 306). This can be done, for example, by setting a Boolean switch NETWORK_ISOLATION=TRUE in the memory of the slave node. In addition, the slave node switches to the master node for the network cluster (block 308) and begins to advertise itself as the master node once it determines that it can no longer communicate with the master node via the data transfer interfaces. Where the slave node cannot communicate with the master node via the data transfer interfaces (block 304), the slave node can safely assume the role of the master node and accept the failover user traffic (block 310). Acceptance of the failover traffic can be done by whatever mechanism is available (such as, for example, GARP/FHRP) and/or Layer 3 of associated networks (such as, for example, dynamic routing) protocol still running on external systems. As discussed below in relation to FIG. 4, the master node is concurrently switching to the slave node and ceasing any advertisement as the master node for the network cluster. As such, more than one node of the network cluster are not simultaneously advertising itself as the master node. With the former slave node now operating as the master node for the network cluster and accepting failover user traffic, control is returned to block 216 of FIG. 2.

Figure 4:
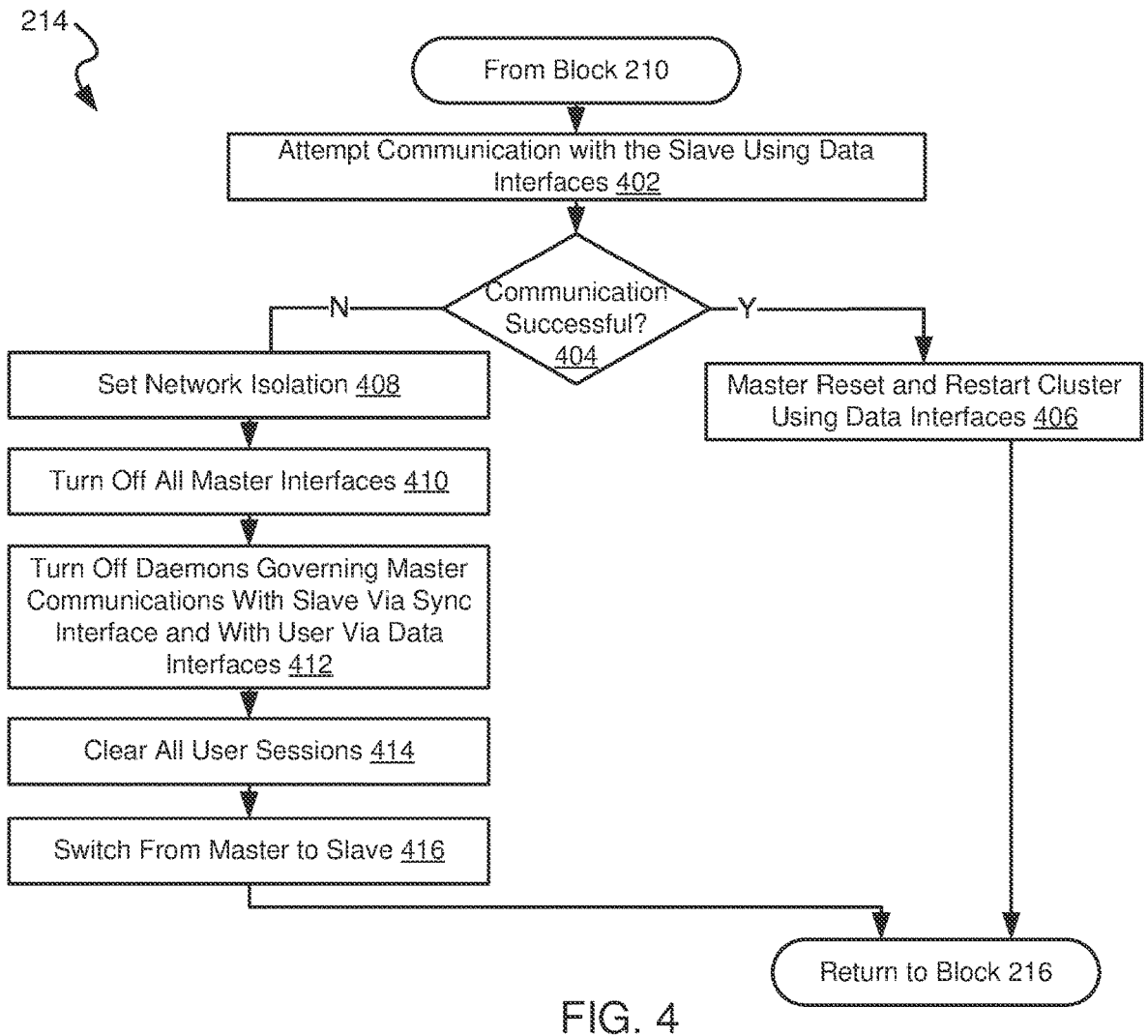
FIG. 4 is a flow diagram showing a method in accordance with some embodiments for performing split-brain recovery in a master node of a network cluster.

Turning to FIG. 4 and following flow diagram 214, the master node attempts communication with the slave node using the data transfer interfaces (block 402). Where communication via the data transfer interfaces is now possible (block 404), the master node causes a master reset and network cluster restart using communications performed over the data transfer interfaces (block 406). This master reset and network cluster restart may be done using any processes know in the art to return the network cluster to full operation. Once the reset and restart are complete (block 406), split-brain master processing completes and control is returned to block 216 of FIG. 2.

Alternatively, where communication via the data transfer interfaces is still not possible (block 404), the master node flags a network isolation scenario for the master node (block 408). Similar to the slave node discussed in FIG. 3, flagging the network isolation can be done, for example, by setting a Boolean switch NETWORK_ISOLATION=TRUE in the memory of the master node. In addition, the master node turns of all master interfaces (e.g., data transfer interfaces and sync interfaces) (block 410), turns off all software daemons (e.g., Layer 2 processes for the associated networks) governing master communications with the slave node via the sync interface and/or the data transfer interfaces (block 412), and clears all ongoing sessions of user traffic (block 414). Turning off all of the interfaces of the master node prevents user traffic black-holing and triggers an automated failover to external systems via Layer 2 of associated networks (such as, for example, GARP/FHRP) and/or Layer 3 of associated networks (such as, for example, dynamic routing) protocol still running on external systems. Turning off the software daemons prepares for a graceful, future fail back. Clearing all ongoing sessions of user traffic eliminates stale information and prepares the node to receive future session synchronization in accordance with the operation of the network cluster without causing conflicts due to stale local session information.

In addition, the master node switches to the slave node for the network cluster (block 416) and ceases to advertise itself as the master node. As discussed in relation to FIG. 3 above, the slave node is concurrently switching to the master node and advertising itself as the master node for the network cluster. As such, at least one node is taking over user traffic processing for the network cluster. With the former master node now operating as the slave node for the network cluster, control is returned to block 216 of FIG. 2.

Returning to FIG. 2, both nodes attempt communications via the sync interface to determine whether the resetting and restarting processes of block 214 restored operation of the sync interface (block 216). Processing by the network cluster remains with the switched master and slave nodes done in blocks 212, 214 until the nodes detect communications via the sync interface (block 216). Once communication via the sync interface is restored (block 216), the network cluster is restarted using the sync interface (block 218). Such a network cluster restart can be done using any process known in the art for restoring network cluster operability.

With the network cluster restarted (block 218), each node determines whether network isolation was flagged as part of the processing of blocks 212, 214 (block 220). Where network isolation was not flagged (block 220) (e.g., NETWORK_ISOLATION=FALSE), the split-brain flag previously set in block 207 is reset (block 221). This can be done, for example, by setting the Boolean switch SPLIT_BRAIN_DETECTED=FALSE in the memory of the respective nodes. The network cluster has now fully restored to a normal operating condition (steady state) with minimum service disruptions, and the process returns again to block 202.

Alternatively, where network isolation was flagged (block 220) (e.g., NETWORK_ISOLATION=TRUE), all interfaces are turned on for both the current master node and the current slave node (block 222). This includes turning on any data transfer interface that was not previously operating as the slave interface was already turned on and found to be operational. Processing by the network cluster remains with the switched master and slave nodes done in blocks 212, 214 until the nodes detect that all interfaces have been restored to operation (block 224). The restoration can be verified by attempted communications between the master node and the slave node using the data transfer interfaces.

Once communication via the data transfer interfaces is restored (block 224), each node determines whether they are the master or the slave (block 226). The slave node performs slave fail back mitigation (block 228) and the master node performs master fail back mitigation (block 230). The various processes of block 228 are shown in a flow diagram of the same number in FIG. 5, and the various processes of block 230 are shown in a flow diagram of the same number in FIG. 6.

Figure 5:
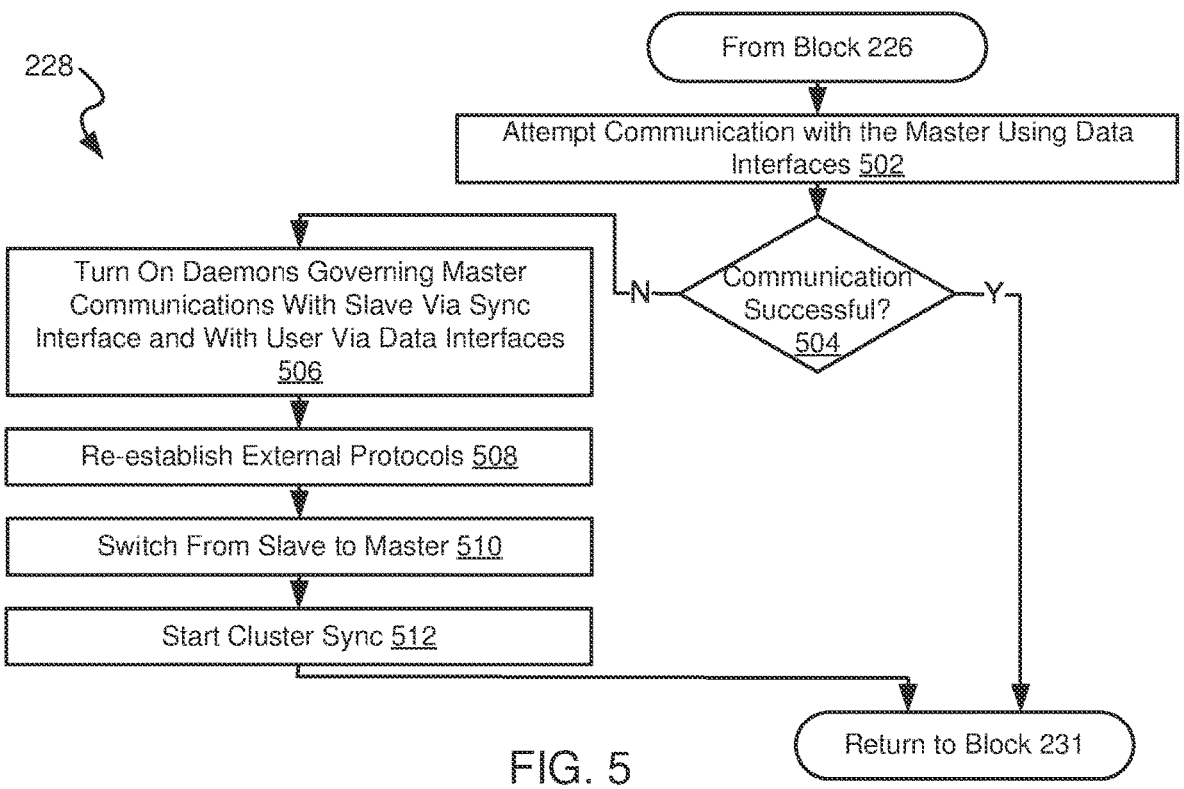
FIG. 5 is a flow diagram showing a method in accordance with various embodiments for performing fail back avoidance in a slave node of a network cluster.

Turning to FIG. 5 and following flow diagram 228, the current slave node attempts communication with the current master node using the data transfer interfaces (block 502). Where communication via the data transfer interfaces is now possible (block 504), no changes are required to return from network isolation and processing completes with control being returned to block 231 of FIG. 2. Alternatively, where communication via the data transfer interfaces is still not possible (block 504), the current slave node turns on all software daemons governing master communications with the slave node via the sync interface and/or the data transfer interfaces (block 506), and reestablishes all external protocols (block 508) in preparation for taking on the responsibilities of a master node in the network cluster. With this done, the current slave node switches to the master node for the network cluster (block 510) and issues the commands required to resynchronize operation of the network cluster using the sync interface (block 512). The master node does not need to know if slave node experiences network isolation, but rather only needs to restart network cluster synchronization as soon as the sync interface becomes available. As discussed below in relation to FIG. 6, the current master node is concurrently switching to the slave node. As such, only one node is operating as the master node within the network cluster at any given time. With the current slave node now operating as the master node for the network cluster, control is returned to block 231 of FIG. 2.

Figure 6:
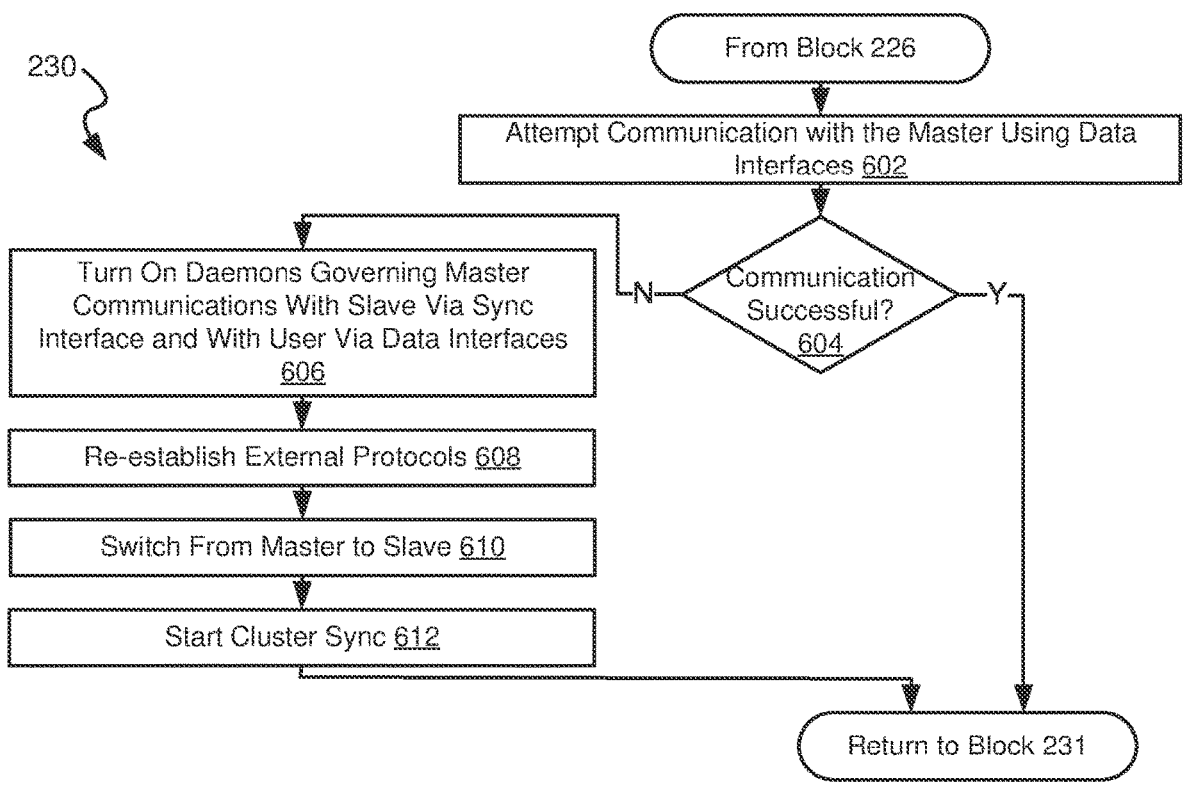
FIG. 6 is a flow diagram showing a method in accordance with various embodiments for performing fail back avoidance in a master node of a network cluster.

Turning to FIG. 6 and following flow diagram 230, the current master node attempts communication with the current slave node using the data transfer interfaces (block 602). Where communication via the data transfer interfaces is now possible (block 604), no changes are required to return from network isolation and processing completes with control being returned to block 231 of FIG. 2. Alternatively, where communication via the data transfer interfaces is still not possible (block 604), the current master node turns on all software daemons governing master communications with the slave node via the sync interface and/or the data transfer interfaces (block 606), and reestablishes all external protocols (block 608) in preparation for taking on the responsibilities of a slave node in the network cluster. Re-enabling the slave node's Layer 2 and/or Layer 3 processes (daemons) triggers user traffic session fail back from external systems via Layer 2 of the associated networks (such as, for example, GARP/FHRP) and/or Layer 3 of the associated networks (such as dynamic routing) protocol convergence. Reestablishing external Layer 2 and/or Layer 3 networking connectivity with external systems via Layer 2 (such as, for example, GARP/FHRP) and/or Layer 3 (such as dynamic routing) protocol also triggers user traffic session fail back. Any fail back user traffic is received by the slave node which negotiates with the master node via the sync interface to assume the role of master node.

With the various re-enabling processes complete (blocks 604, 606, 608), the current master node switches to the slave node for the network cluster (block 610) and starts resynchronization of the network cluster under the command of the master node (block 612). The slave node maintains its data transfer interfaces in a disabled state until the latest user traffic session information is received from the master node via sync interface. From this point, the slave node receives regular network cluster session synchronization from the master node. Once the network cluster synchronization is complete, the slave node re-enables its data transfer interfaces and initiates monitoring of all data transfer interfaces to verify reliability and readiness to carry over user traffic if or when a need arises. As discussed above in relation to FIG. 5, the current slave node is concurrently switching to the master node. As such, a node is operating as the master node within the network cluster. With the current master node now operating as the slave node for the network cluster, the network cluster has been restored to a normal operating condition (steady state) with minimum service disruptions and control is returned to block 231 of FIG. 2.

Returning to FIG. 2, each node resets both its network isolation flag and its split-brain flag (block 231). This can be done, for example, by setting the Boolean switch NETWORK_ISOLATION=FALSE and SPLIT_BRAIN_DETECTED=FALSE in the memory of the respective nodes. The network cluster has now fully restored to a normal operating condition (steady state) with minimum service disruptions, and the process returns again to block 202.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A network cluster having split-brain processing, the network cluster comprising:
   a first node including a first data transfer interface, a second data transfer interface, and a first sync interface;
   a second node including a third data transfer interface, a fourth data transfer interface, and a second sync interface; wherein the second node is communicably coupled to the first node via a sync path that includes at least the first sync interface and the second sync interface; wherein the second node is communicably coupled to the first node via a data path that includes at least one pair of (a) the first data transfer interface and the third data transfer interface, and (b) the second data transfer interface and the fourth data transfer interface; and wherein the second node includes:
   a processing resource; and
   a non-transitory computer-readable medium coupled to the processing resource, wherein the non-transitory computer-readable medium has stored thereon instructions that when executed by the processing resource cause the processing resource to:
   determine a failure of the sync path;
   determine a potential for continued transfer of user traffic via the first data transfer interface and the second data transfer interface; and
   indicate a split-brain scenario upon detection of the failure of the sync path and the potential for continued transfer of user traffic via the first data transfer interface and the second data transfer interface.

2. The system of claim 1, wherein the processing resource is a first processing resource, wherein the non-transitory computer-readable medium is a first non-transitory computer-readable medium, and wherein the first node further includes:
   a second processing resource; and
   a second non-transitory computer-readable medium coupled to the second processing resource, wherein the second non-transitory computer-readable medium has stored thereon instructions that when executed by the second processing resource cause the second processing resource to:
  determine a failure of the sync path;
  determine a potential for continued transfer of user traffic via the third data transfer interface and the fourth data transfer interface; and
  indicate a split-brain scenario upon detection of the failure of the sync path and the potential for continued transfer of user traffic via the third data transfer interface and the fourth data transfer interface.

3. The system of claim 1, wherein the non-transitory computer-readable medium has stored thereon instructions that when executed by the processing resource cause the processing resource to:
  based at least in part on the indicated split-brain scenario, perform a split-brain recovery.

4. The system of claim 3, wherein the instructions that when executed by the processing resource cause the processing resource to perform the split-brain recovery include instructions that when executed by the processing resource cause the processing resource to:
  indicate a network isolation of the second node based at least in part on an inability to communicate with the first node using one or both of the first data transfer interface and the second data transfer interface;
  switch the second node from a role as a slave node to a role as a master node; and
  accept failover user traffic.

5. The system of claim 4, wherein the non-transitory computer-readable medium has stored thereon instructions that when executed by the processing resource cause the processing resource to:
  based at least in part on the indicated network isolation of the second node, perform a fail back mitigation.

6. The system of claim 5, wherein the instructions that when executed by the processing resource cause the processing resource to perform fail back mitigation include instructions that when executed by the processing resource cause the processing resource to:
  enable a software daemon governing master communications;
  switch the second node from a role as a master node to a role as a slave node; and
  start synchronization with the first node.

7. The system of claim 3, wherein the instructions that when executed by the processing resource cause the processing resource to perform the split-brain recovery include instructions that when executed by the processing resource cause the processing resource to:
  indicate a network isolation of the second node based at least in part on an inability to communicate with the first node using one or both of the first data transfer interface and the second data transfer interface;
  disable the third data transfer interface and the fourth data transfer interface;
  disable a software daemon governing master communications;
  clear all user traffic; and
  switch the second node from a role as a master node to a role as a slave node.

8. The system of claim 7, wherein the non-transitory computer-readable medium has stored thereon instructions that when executed by the processing resource cause the processing resource to:
  based at least in part on the indicated network isolation of the second node, perform a fail back mitigation.

9. The system of claim 8, wherein the instructions that when executed by the processing resource cause the processing resource to perform fail back mitigation include instructions that when executed by the processing resource cause the processing resource to:
  enable a software daemon governing master communications;
  switch the second node from a role as a slave node to a role as a master node; and
  start synchronization with the first node.

10. The system of claim 3, wherein the instructions that when executed by the processing resource cause the processing resource to perform the split-brain recovery include instructions that when executed by the processing resource cause the processing resource to:
  perform master reset and restart of the network cluster including issuing commands to the first node using one or both of the third data transfer interface and the fourth data transfer interface.

11. A method for network cluster operation, the method comprising:
  determining, by a first node of a network cluster, a failure of a sync path communicably coupling the first node to a second node of the network cluster;
  determining, by the first node, a potential for continued transfer of user traffic via at least one of a first data transfer interface of the second node or a second data transfer interface of the second node; and
  indicating, by the first node, a split-brain scenario upon detection of the failure of the sync path and the potential for continued transfer of user traffic via the first data transfer interface or the second data transfer interface.

12. The method of claim 11, the method further comprising:
  performing, by the first node, a split-brain recovery.

13. The method of claim 12, wherein performing the split-brain recovery includes:
  indicating a network isolation of the first node based at least in part on an inability to communicate with the second node using one or both of the first data transfer interface or the second data transfer interface;
  switching the first node from a role as a slave node to a role as a master node; and
  accepting failover user traffic.

14. The method of claim 13, the method further comprising:
  based at least in part on the indicated network isolation of the first node, performing a fail back mitigation by the first node.

15. The method of claim 14, wherein performing the fail back mitigation includes:
  enabling, by the first node, a software daemon governing master communications;
  switching the first node from a role as a master node to a role as a slave node; and
  starting synchronization with the second node.

16. The method of claim 12, wherein performing the split-brain recovery includes performing, by the first node, a master reset and restart of the network cluster including issuing commands to the second node using one or both of a third data transfer interface and a fourth data transfer interface.

17. The method of claim 12, wherein performing the split-brain recovery includes:
  indicating a network isolation of the first node based at least in part on an inability to communicate with the second node using one or both of the first data transfer interface or the second data transfer interface;

disabling a third data transfer interface and a fourth data transfer interface of the first node;

disabling a software daemon governing master communications;

clearing all user traffic; and switching the first node from a role as a master node to a role as a slave node.

18. The method of claim 17, the method further comprising: based at least in part on the indicated network isolation of the first node, performing a fail back mitigation by the first node.

19. The method of claim 18, wherein performing the fail back mitigation includes:

enabling, by the first node, a software daemon governing master communications;

switching the first node from a role as a slave node to a role as a master node; and starting synchronization with the second node.

20. A non-transitory computer-readable storage medium embodying a set of instructions, which when executed by one or more processing resources of a computer system, causes the one or more processing resources to perform a method comprising:

determining, by a first node of a network cluster, a failure of a sync path communicably coupling the first node to a second node of the network cluster;

determining a potential for continued transfer of user traffic via at least one of a first data transfer interface of the second node or a second data transfer interface of the second node;

indicating a split-brain scenario upon detection of the failure of the sync path and the potential for continued transfer of user traffic via the first data transfer interface or the second data transfer interface; and based at least in part on indicating the split-brain scenario, performing, by the first node, a split-brain recovery.

21. The non-transitory computer-readable storage medium of claim 20, wherein the set of instructions, which when executed by one or more processing resources of the computer system, causes the one or more processing resources to perform the method that further comprises:

indicating a network isolation of the first node based at least in part on an inability to communicate with the second node using one or both of the first data transfer interface or the second data transfer interface;

switching the first node from a role as a slave node to a role as a master node; and accepting failover user traffic.

22. The non-transitory computer-readable storage medium of claim 21, wherein the set of instructions, which when executed by one or more processing resources of the computer system, causes the one or more processing resources to perform the method that further comprises:

based at least in part on the indicated network isolation of the first node, performing a fail back mitigation by the first node.

23. The non-transitory computer-readable storage medium of claim 22, wherein the set of instructions, which when executed by one or more processing resources of the computer system, causes the one or more processing resources to perform the method that further comprises:

enabling, by the first node, a software daemon governing master communications;

switching the first node from a role as a master node to a role as a slave node; and starting synchronization with the second node.

24. The non-transitory computer-readable storage medium of claim 20, wherein performing the split-brain recovery includes:

indicating a network isolation of the first node based at least in part on an inability to communicate with the second node using one or both of the first data transfer interface or the second data transfer interface;

disabling a third data transfer interface and a fourth data transfer interface of the first node;

disabling a software daemon governing master communications;

clearing all user traffic; and switching the first node from a role as a master node to a role as a slave node.

25. The non-transitory computer-readable storage medium of claim 24, wherein the set of instructions, which when executed by one or more processing resources of the computer system, causes the one or more processing resources to perform the method that further comprises:

based at least in part on the indicated network isolation of the first node, performing a fail back mitigation by the first node.

26. The non-transitory computer-readable storage medium of claim 25, wherein performing the fail back mitigation includes enabling, by the first node, a software daemon governing master communications;

switching the first node from a role as a slave node to a role as a master node; and starting synchronization with the second node.

27. The non-transitory computer-readable storage medium of claim 20, wherein performing the split-brain recovery includes performing, by the first node, a master reset and restart of the network cluster including issuing commands to the second node using one or both of a third data transfer interface and a fourth data transfer interface.

* * * * *